(12) United States Patent
Sela et al.

(10) Patent No.: US 10,438,664 B2
(45) Date of Patent: Oct. 8, 2019

(54) NON-VOLATILE STORAGE DEVICE WITH PHYSICAL AUTHENTICATION

(71) Applicant: Western Digital Technologies, Inc., Irvine, CA (US)

(72) Inventors: Rotem Sela, Hod Hasharon (IL); Miki Sapir, Nes Ziona (IL); Enosh Levi, Kochav Yair (IL)

(73) Assignee: Western Digital Technologies, Inc., San Jose, CA (US)

(*) Notice: Subject to any disclaimer, the term of this patent is extended or adjusted under 35 U.S.C. 154(b) by 115 days.

(21) Appl. No.: 15/435,668

(22) Filed: Feb. 17, 2017

(65) Prior Publication Data

US 2018/0173421 A1    Jun. 21, 2018

Related U.S. Application Data

(60) Provisional application No. 62/434,766, filed on Dec. 15, 2016.

(51) Int. Cl.
| | |
|---|---|
| *G11C 16/10* | (2006.01) |
| *G11C 16/22* | (2006.01) |
| *G06F 21/31* | (2013.01) |
| *G06F 21/57* | (2013.01) |
| *G11C 7/24* | (2006.01) |

(52) U.S. Cl.
CPC ............ *G11C 16/105* (2013.01); *G06F 21/31* (2013.01); *G06F 21/572* (2013.01); *G11C 16/22* (2013.01); *G11C 7/24* (2013.01)

(58) Field of Classification Search
CPC ....... G06F 3/0655; G06F 3/0688; G06F 3/061

USPC ......................................................... 711/103
See application file for complete search history.

(56) References Cited

U.S. PATENT DOCUMENTS

| | | | |
|---|---|---|---|
| 6,591,376 B1 | 7/2003 | Van Rooven | |
| 6,862,681 B2 | 3/2005 | Cheston | |
| 7,143,275 B2 | 11/2006 | Cepulis | |
| 9,292,302 B2* | 3/2016 | Sasaki | G06F 9/4401 |
| 2003/0023822 A1* | 1/2003 | Scott | G06F 12/1433 |
| | | | 711/163 |
| 2005/0086037 A1* | 4/2005 | Pauley | G11C 29/56 |
| | | | 703/14 |
| 2007/0113102 A1* | 5/2007 | Glen | G06F 21/602 |
| | | | 713/189 |
| 2012/0117308 A1* | 5/2012 | Lou | G06F 21/572 |
| | | | 711/103 |
| 2015/0115832 A1* | 4/2015 | Conroy | G05F 1/56 |
| | | | 315/294 |
| 2015/0199028 A1* | 7/2015 | Spangler | G06F 3/0227 |
| | | | 713/2 |

(Continued)

OTHER PUBLICATIONS

Fujitsu, Jumper Settings, pp. 13-15 http://www.fujitsu.com/downloads/COMP/fcpa/hdd/discontinued/mpd3xxxat_jumpers.pdf (Year: 1999).*

(Continued)

*Primary Examiner* — Charles Rones
*Assistant Examiner* — Jonah C Krieger
(74) *Attorney, Agent, or Firm* — Vierra Magen Marcus LLP

(57) ABSTRACT

A non-volatile memory device uses physical authentication to enable the secure programming of a boot partition, when the boot partition is write protected. This physical authentication can also be used to enable other features/functions.

9 Claims, 8 Drawing Sheets

(56) References Cited

U.S. PATENT DOCUMENTS

| | | | |
|---|---|---|---|
| 2015/0286585 A1* | 10/2015 | Caraccio | G06F 12/1458 |
| | | | 713/189 |
| 2016/0004660 A1* | 1/2016 | Lee | G06F 13/4068 |
| | | | 710/308 |
| 2017/0199676 A1* | 7/2017 | Choi | G11C 16/3495 |

OTHER PUBLICATIONS

"INAND Extreme, e.MMC 5.0 with HS400 Intertace," SanDisk Corporation, Feb. 2015.
"Embedded MultiMediaCard(e•MMC) e•MMC/Card Product Standard, High Capacity, including Reliable Write, Boot, Sleep Modes, Dual Data Rate, Multiple Partitions Supports and Security Enhancement (MMCA, 4.4)," JEDEC Standard No. 84-A44, Mar. 2009.

\* cited by examiner

Figure 1

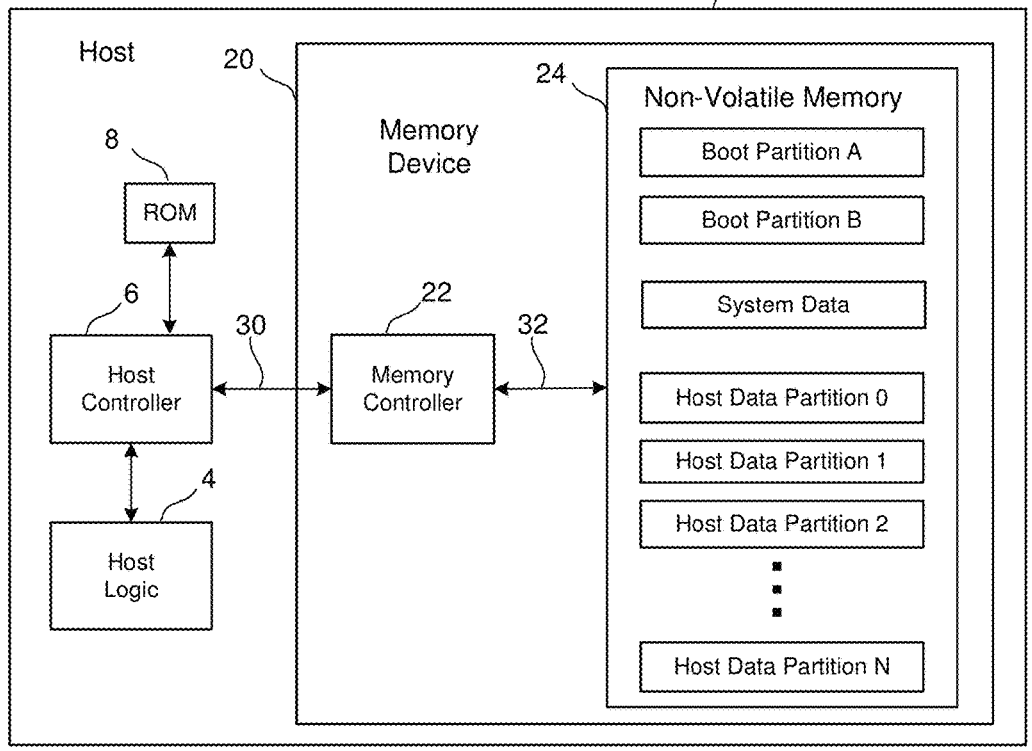

Figure 2

| Signal | Type | Description |
|---|---|---|
| DATA[0:7] | Input/Output | Bi-directional channel used for data transfer |
| CMD | Input/Output | Command: A bi-directional channel used for device initialization and command transfers |
| CLK | Input | Clock: Each clock cycle directs a 1 bit transfer on the CMD and DATA[0:7] lines |
| RST | Input | Hardware Reset |
| RCLK | Output | Data Strobe |
| VCC | Supply | Four pins used to provide power supply to memory die |
| VCCQ | Supply | Five pins used to provide power supply to memory controller |
| VSS | Supply | Six pins used to provide ground connection to memory die |
| VSSQ | Supply | Five pins used to provide ground connection to memory controller |
| VSF[1:4] | Input/Output | Vendor specific pins |

Figure 5

| bit 3 | bit 2 | bit 1 | bit 0 |
|---|---|---|---|
| B_PWR_WP_DIS | B_PERM_WP_DIS | B_PERM_WP_EN | B_PWR_WP_EN |

Figure 6

| bit 7 | bit 6 | bit 5 | bit 4 | bit 3 | bit 2 | bit 1 | bit 0 |
|---|---|---|---|---|---|---|---|
| F_7 | F_6 | F_5 | F_4 | F_3 | F_2 | F_1 | PERM_WP_BP |

Figure 7

| bit 3 | bit 2 | bit 1 | bit 0 |
|---|---|---|---|
| VSF[4]_POR_Status | VSF[3]_POR_Status | VSF[2]_POR_Status | VSF[1]_POR_Status |

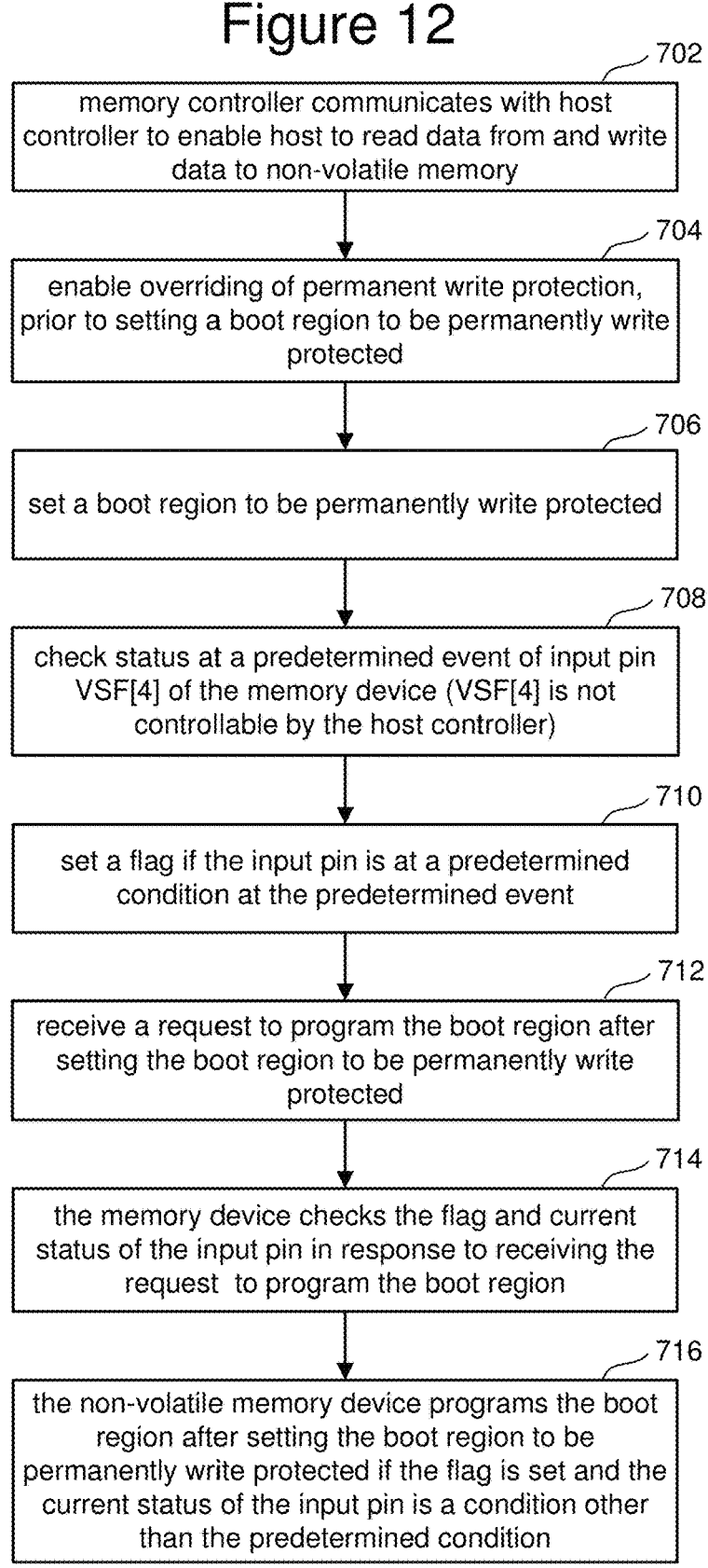

NON-VOLATILE STORAGE DEVICE WITH PHYSICAL AUTHENTICATION

This application claims priority from U.S. Provisional Application 62/434,766, "Non-Volatile Storage Device With Physical Authentication," filed on Dec. 15, 2016.

BACKGROUND

Many electronic apparatus make use of embedded memory devices. Often, the embedded memory device includes non-volatile memory such as flash memory. An electronic apparatus that includes an embedded memory device (or is connected to a memory device) is often referred to as a host.

The process of a host starting operation and entering a state of readiness for intended operation is called "booting" or a "boot process." A host typically has a ROM (Read Only Memory) which stores code to start the boot process. When a host is turned on or restarted, it will execute the code stored in the ROM which will instruct the host to read boot data from a dedicated portion of the embedded memory device. The boot data, which can include code as well as reference information (e.g., fields, integers, floating point numbers, characters, words, pointers, etc.), will be used by the host to perform a boot process.

One example of an embedded memory device is an embedded MultiMediaCard ("eMMC"), which implements a MultiMediaCard ("MMC") interface. Some eMMC devices include a boot region which may comprise one or more boot partitions. Each boot partition is capable of storing all of the boot data needed to perform a boot process. The MMC standard provides for the host to be able to permanently write protect the boot region. However, there may be a need to program the boot region after it has been permanently write protected.

BRIEF DESCRIPTION OF THE DRAWINGS

Like-numbered elements refer to common components in the different figures.

FIG. 1 is a block diagram of a memory device embedded in (and/or connected to) a host device.

FIG. 2 is a table of input and/or output signals for the memory device.

FIGS. 5, 6 and 7 are tables depicting parameters used by a memory device.

FIG. 12 is a flow chart describing one embodiment of a process for using physical authentication to enable programming of data into the boot partition when the boot partition is permanently write protected.

DETAILED DESCRIPTION

Figure 3:
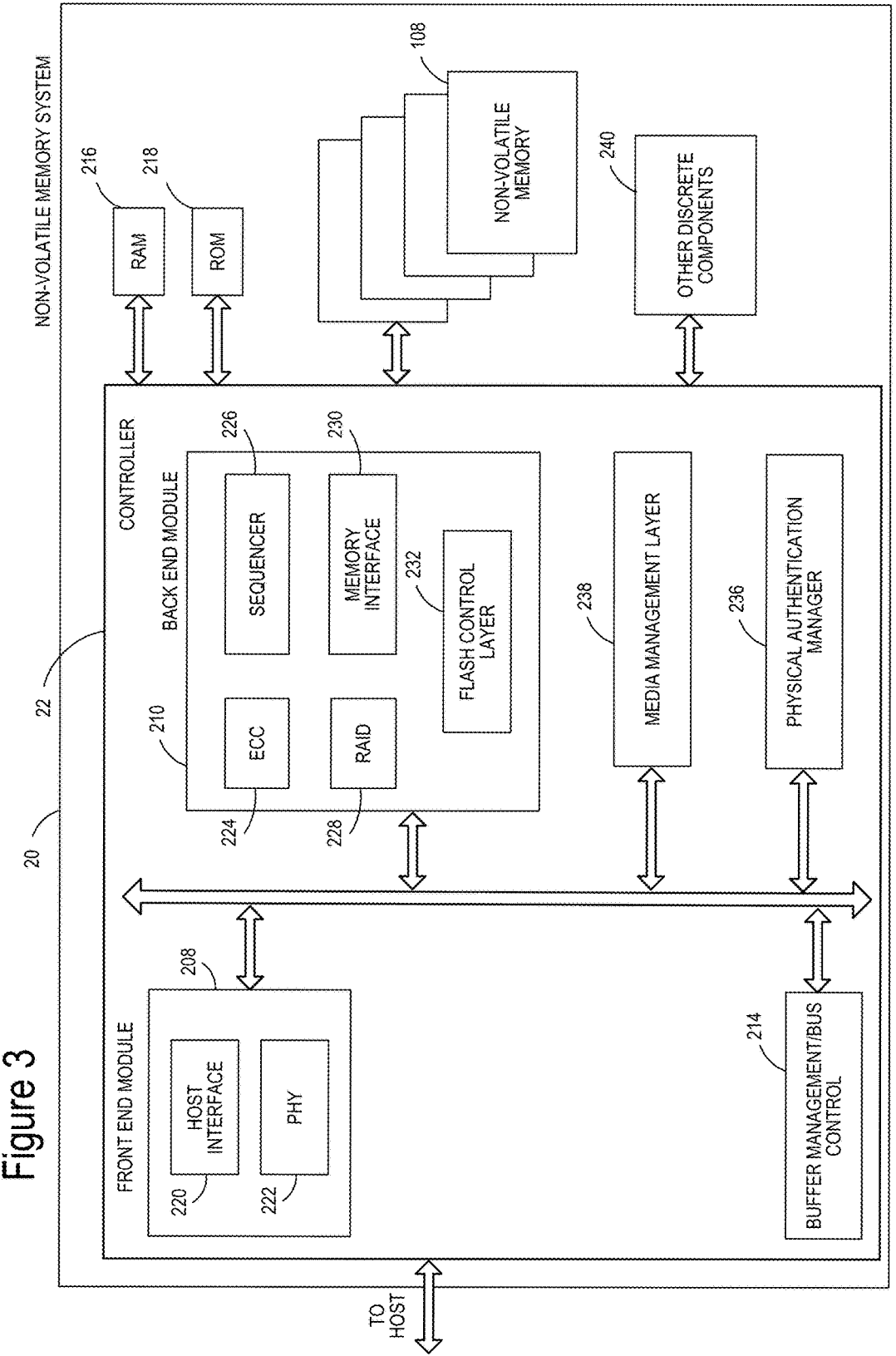
FIG. 3 is a block diagram of one example of a memory device.

A non-volatile memory device is proposed that uses physical authentication to enable the secure programming of a boot partition, when the boot partition is permanently write protected. This physical authentication can also be used to enable other features/functions; for example, setting or resetting secure keys which are to be installed in a secure environment, restoring a device to manufacturing state, setting a protected variable, changing something core to the operating system, accessing highly secure data, etc. Physical authentication could also be used to enable a logical authentication which will enable one or more functions.

In one embodiment, the physical authentication includes a predetermined sequence of signals on a set of one or more input pins that are outside of the interface between the host and the non-volatile memory device.

In one example implementation, the physical authentication includes the manual setting of an input pin of the memory to a predetermined condition just prior to power-on (or other predetermined event). The memory device is connected to a host. The input pin will not be part of the interface between the memory device and the host such that the host will not have access to the input pin. Thus, the manual setting of an input pin will be performed by a human, a test machine or other entity other than the host. At power-on (or other predetermined event), the memory device sets a flag if the input pin is at the predetermined condition. Subsequently, the signal at the input pin is changed so that the input pin is no longer at the predetermined condition. In response to receiving a request from the host to perform a function, the memory device checks the flag and verifies that the input pin has been changed from the predetermined condition. The memory device performs the function if the flag is set and the current status of the input pin is a condition other than the predetermined condition (both of which together indicate that physical authentication was successful).

FIG. 1 is a block diagram depicting one embodiment of a memory device 20 embedded in a host device 2 that implements the physical authentication technology described herein. Host device 2 includes host logic 4 for performing the intended functions of host 2. For example, host 2 can be a smartphone, PDA, laptop, set top box or other electronic device. Host logic 4 performs the functions of a smartphone, PDA, laptop, set top box, etc. Host logic 4 is connected to host controller 6 for communicating with memory device 20 via host interface 30. In one embodiment, memory device 20 is an eMMC memory device and host interface 30 is a MMC interface. Host controller 6 is also in communication with ROM 8.

In one embodiment, ROM 8 stores code to start the boot process for host 2. When host 2 is turned on or restarted (or is otherwise restarting the boot process), host controller 6 accesses code in ROM 8 to start the boot process. That code will instruct host controller 6 to read the boot data from a boot partition in embedded memory device 20.

Memory device 20 includes memory controller 22 in communication with non-volatile memory 24. Note that FIG. 1 shows a logical depiction of non-volatile memory 24. In one embodiment, non-volatile 24 can be implemented using one or multiple memory die. Interface 32 between memory control 22 and non-volatile memory 24 maybe any suitable interface including toggle mode 200, 400 or 800. Non-volatile memory 24 includes Boot Partition A, Boot Partition B, System Data, Host Data Partition 0, Host Data Partition 1, Host Data Partition 2, . . . , Host Data Partition N. Non-volatile memory device 20 includes two partitions for storing boot data used to boot host 2: Boot Partition A and Boot Partition B. In one embodiment, the two boot partitions can store copies of the same information or store different versions of boot data. The boot data can include code for programming host controller 6 or other portions of host 2, as well as reference information (e.g., fields, integers, floating point numbers, characters, words, etc.). System Data includes various parameters used by memory controller 22 and/or non-volatile memory 24 for operating non-volatile memory 24. Host Data Partition 0, Host Data Partition 1, Host Data Partition 2, . . . , Host Data Partition N are portions of the non-volatile memory that store data for the host 2.

FIG. 2 is table of input and/or output signals for the memory device 20. The table depicts the following signals DATA[0:7], CMD, CLK, RST, RCLK, VCC, VCCQ, VSS, VSSQ, and VSF[1:4]. The signals depicted in FIG. 2, other than VSF[1:4], implement an MMC interface as the host interface 30 between memory device 20 and host 2. More specifically, these signals implement an MMC interface between memory controller 22 and host controller 6. VSF[1:4] are connected to memory controller 22 but they are not connected to host controller 6. That is, VSF[1:4] are set of one or more inputs that are outside of the host interface 20. Host 2 (including host controller 6) has no access to VSF[1:4]. Therefore, VSF[1:4] cannot be controlled by software running on host 2. In one embodiment, memory device 20 is mounted on a printed circuit board and VSF[1:4] are connected to a test point on that printed circuit board. A human can manually attach a wire or probe to that test point to drive signals on or read signals from VSF[1:4]. Alternatively, a test machine or other machine (other than host 2) can manually or automatically connect to and drive signals on or read signals from VSF[1:4]. In one embodiment, VSF[1:4] are four pins, but in other embodiments more or less than four pins can be used. VSF[1:4] can be input/output pins or just input only pins.

FIG. 3 is a block diagram of one example of a memory device 20. However, the architecture depicted in FIG. 3 can also be used to implement other types of non-volatile storage devices. Memory device 20 includes a controller 22 connected to one or more non-volatile memory die 108 (which comprise the non-volatile memory 24 depicted in FIG. 1). As used herein, for a system that uses non-volatile memory, a controller is a device that manages data stored on the non-volatile memory and communicates with a host. Controller 22 can have various functionality in addition to the specific functionality described herein. For example, controller 22 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. In operation, when a host needs to read data from or write data to the non-volatile memory, it will communicate with controller 22. If the host provides a logical address to which data is to be read/written, controller 22 converts the logical address received from the host to a physical address in the physical flash memory. Alternatively, the host can provide the physical address. Controller 22 can also perform various memory management functions, such as, but not limited to, wear leveling (distributing write operations among memory die or blocks of the memory die to avoid wearing out specific blocks of memory that would otherwise be repeatedly written to) and garbage collection (after a block is full, moving only the valid pages of data to a new block, so the full block can be erased and reused).

The interface between controller 22 and non-volatile memory die 108 may be any suitable flash interface, such as Toggle Mode 200, 400, or 800. In some embodiments, memory device 20 includes a single channel between controller 22 and non-volatile memory die 108; however, the subject matter described herein is not limited to having a single memory channel. For example, in some memory system architectures 2, 4, 8 or more channels may exist between controller 12 and memory die 108, depending on controller capabilities. In any of the embodiments described herein, more than a single channel may exist between controller 22 and memory die 108, even if a single channel is shown in the drawings.

As depicted in FIG. 3, controller 22 includes a front end module 208 that interfaces with a host, a back end module 210 that interfaces with the one or more non-volatile memory die 108, and various other modules that perform functions which will now be described.

The components of controller 22 depicted in FIG. 3 may take the form of a packaged functional hardware unit (e.g., an electrical circuit) designed for use with other components, program code (e.g., software or firmware) executable by a (micro) processor or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., memory) to program a processor to perform the functions described herein.

Referring again to modules of the controller 22, a buffer manager/bus control 214 manages random access memory (RAM) 216 and controls the internal bus arbitration of controller 22. A read only memory (ROM) 218 stores boot code for the controller. Although illustrated in FIG. 3 as located separately from the controller 22, in other embodiments one or both of the RAM 216 and ROM 218 may be located within the controller. In yet other embodiments, portions of RAM and ROM may be located both within the controller 22 and outside the controller. Further, in some implementations, controller 22, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fibre Channel, USB, PCIe, MMC and NVMe. The host interface 220 typically facilitates transfer for data, control signals, and timing signals. In one embodiment, front end module 208 provides the single communication interface adapted to communicate with an external computing device for the controller 22 and memory die 108 of memory device 20.

Back end module 210 includes an error correction code (ECC) engine 224 that encodes the data bytes received from the host, and decodes and error corrects the data bytes read from the non-volatile memory die 108. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back end module 210.

Additional components of memory device 20 illustrated in FIG. 3 include media management layer 238, which performs wear leveling of memory cells of non-volatile memory die 108. System 100 also includes other discrete components 240, such as external electrical interfaces, external RAM, resistors, capacitors, or other components that may interface with controller 22. In alternative embodiments, one or more of the physical layer interface 222, RAID module 228, media management layer 238 and buffer management/bus controller 214 are optional components that are not necessary in the controller 22.

The Flash Translation Layer (FTL) or Media Management Layer (MML) 238 may be integrated as part of the flash management that may handle flash errors and interfacing with the host. In particular, MML is responsible for the internals of non-volatile memory management. In particular, the MML 238 may include an algorithm in the memory device firmware which translates writes from the host into writes to the memory of a memory die 108. The MML 238 may be needed because: 1) the memory may have limited endurance; 2) the memory may only be written in multiples of pages; and/or 3) the memory may not be written unless it is erased as a block. The MML 238 understands these potential limitations of the memory which may not be visible to the host. Accordingly, the MML 238 attempts to translate the writes from host into writes into the flash memory 126. As described below, erratic bits may be identified and recorded using the MML 238. This recording of erratic bits can be used for evaluating the health of blocks and/or word lines (the memory cells on the word lines).

Controller 22 also includes physical authentication manager 236, which can be hardware only (e.g., electrical circuit) or software running on a processor. Physical authentication manager 236 manages the physical authentication process and the use of physical authentication to enable performance of a function. Physical authentication manager 236 performs the processes described below with respect to FIG. 9-12 that use physical authentication to enable a function (e.g., using physical authentication to enable programming of data into the boot partition when the boot partition is permanently write protected).

Figure 4:
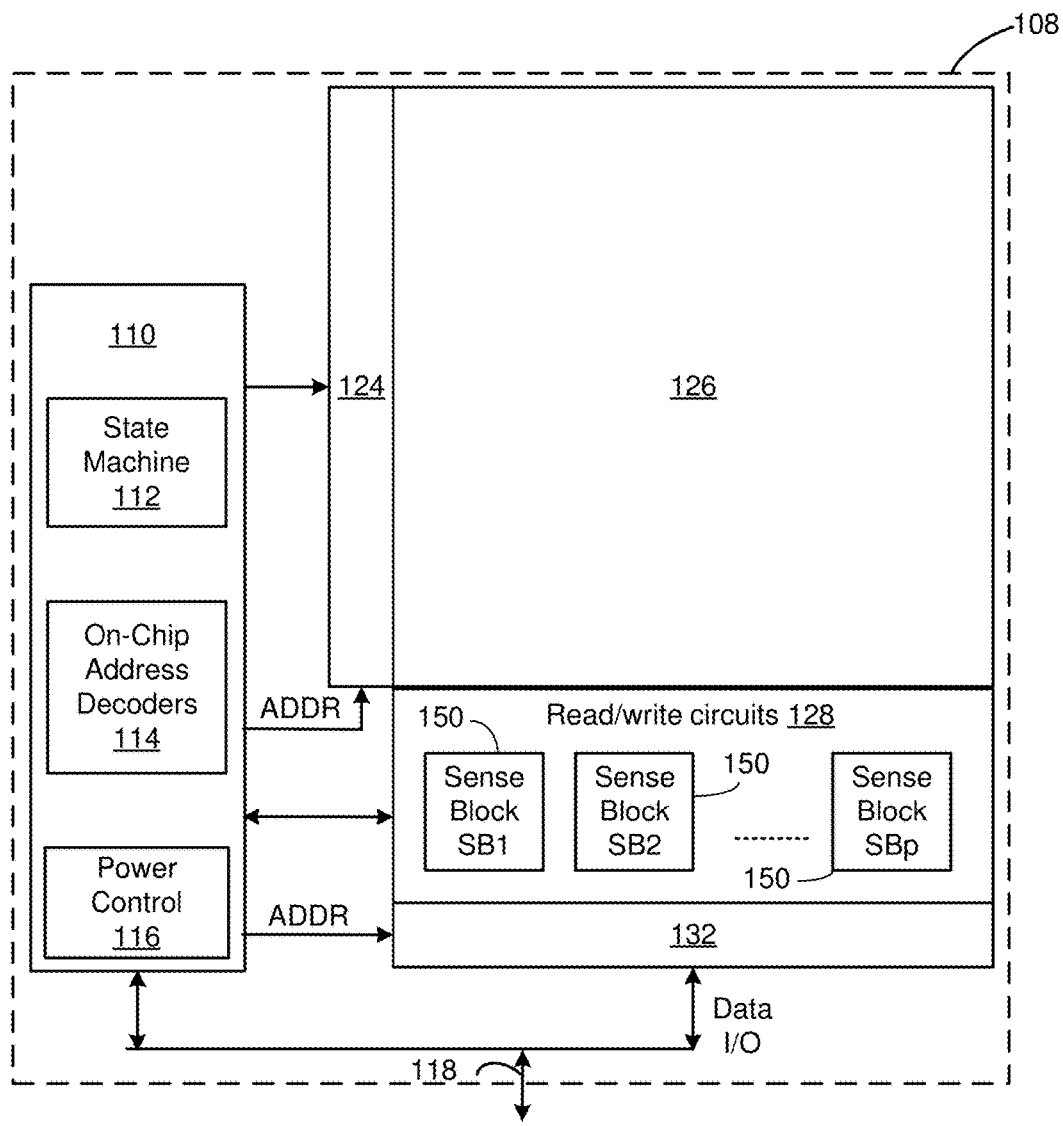
FIG. 4 is a block diagram of a non-volatile memory die.

FIG. 4 is a functional block diagram of an example memory die 108. The components depicted in FIG. 4 are electrical circuits. In one embodiment, memory die 108 includes a monolithic three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, . . . , SBp (sensing circuitry) and allow a page of memory cells to be read or programmed in parallel. Commands and data are transferred between controller 22 and memory die 108 via signal lines 118. In one embodiment, memory die 108 includes a set of input and/or output (I/O) pins that connect to lines 118.

One embodiment of memory structure 126 comprises a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. In one embodiment, memory structure 126 implements three dimensional NAND flash memory. One example of three dimensional NAND flash memory can be found in U.S. Patent Application 2016/0300619, incorporated herein by reference in its entirety. Other embodiments include two dimensional NAND flash memory, two dimensional NOR flash memory, ReRAM cross-point memories, magnetoresistive memory (e.g., MRAM), phase change memory (e.g., PCRAM), and others.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides die-level control of memory operations. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters. On-chip address decoder 114 provides an address interface between addresses used by host 140 or controller 22 to the hardware address used by the decoders 124 and 132. Power control module 116 controls the power and voltages supplied to the word lines and bit lines during memory operations. It can include drivers for word lines, selection transistors, source lines, and other components. Power control module 116 may include charge pumps for creating voltages. The sense blocks 150 include bit line drivers.

Any one or any combination of control circuitry 110, state machine 112, decoders 114/124/132, power control module 116, sense blocks 150, read/write circuits 128, and controller 22 can be considered one or more control circuits that performs the functions described herein.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used within memory structure 126. A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

In one embodiment, a three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration.

One example memory system is a three dimensional memory structure that includes vertical NAND strings with charge-trapping material. Other (2D and 3D) memory structures can also be used with the technology described herein. For example, floating gate memories (e.g., NAND-type and NOR-type flash memory), ReRAM cross-point memories, magnetoresistive memory (e.g., MRAM), and phase change memory (e.g., PCRAM) can also be used.

One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Looking back at FIG. 1, non-volatile memory 24 includes System Data. In one embodiment, System Data includes a set of parameters that are used to configure operation of memory device 20. FIGS. 5, 6, and 7 provide example sets of parameters (which can include flags).

FIG. 5 shows four bits used to configure write protection for the boot partition of non-volatile memory 24 (e.g., Boot Partition A, and Boot Partition B). In one embodiment, the system includes two types of write protection: (1) power-on write protection and (2) permanent write protection. Power-on write protection causes the boot partitions to be write protected until the next power-on event. Permanent write protection causes the boot partitions to be write protected permanently. The parameters B_PWR_WP DIS is used to disable power-on write protect. When this parameter is set to 0, the host is permitted to set B_PWR_WP_EN (bit 0). When this parameter is set to 1, the system disables the use of B_PWR_WP_EN (bit0). The parameter B_PERM_WP_DIS is used to disable permanent write protect. When this parameter is set at 0 the host is permitted to set B_WR_WP_EN (bit 1). When this bit is set to 1, memory device 20 permanently disables the use of B_PWR_WP_EN (bit 2). The parameter B_PERM_WP_EN is for setting permanent write protect. When this parameter is set to 0, the boot region (e.g., Boot Partition A and Boot Partition B) is not permanently write protected. When this parameter is set to 1, the boot region (e.g., Boot Partition A and Boot Partition B) is permanently write protected. The parameter B_PWR_WP_EN is for enabling power-on write protect. When this parameter is set to 0, the boot region (e.g., Boot Partition A and Boot Partition B) is not power-on write protected. When this parameter is set to 1, the boot region is write protected until the next power-on event.

As discussed above, memory device 20 provides for the host to be able to permanently write protect the boot region (e.g., Boot Partition A and Boot Partition B). However, it may be necessary to update a boot partition that has been permanently write protected. Therefore, memory system 20 includes a means for using physical authentication to enable programming of data into the boot partition when the boot partition is permanently write protected.

FIG. 6 is a set of parameters that configure allowing physical authentication to be used to enable different functions. Each of the 8 bits depicted in FIG. 6 pertain to enabling a different function. For example, bit 0

PERM_WP_BP pertains to enabling the programming of a boot partition when permanent write protection has been set. When this bit is set to 1, the means for programming data into a boot partition, with physical authentication, is enabled (even when the boot partition is permanently write protected). Bit 1 of FIG. 6 applies to enabling function F_1, bit 2 applies to enabling function F_2, bit 3 applies to enabling function F_3, bit 4 applies to enabling function F_4, bit 5 applies to enabling function F_5, bit 6 applies to enabling function F_6 and bit 7 applies to enabling function F_7.

As discussed above with respect to FIG. 2, memory device 20 includes four vendor specific pins VSF[1:4]. FIG. 7 shows a set of flags that indicate the status of each of these vendor specific pins VSF[1:4] at power-on (or a different predetermined event). Bit 0 stores flag VSF[1]_POR_Status, which indicates the status of pin VSF[1] at power-on. Bit 1 stores the flag VSF[2]_POR_Status, which indicates the status of pin VSF[2] at power-on. Bit 2 stores the flag VSF[3]_POR_Status which stores the status of pin VSF[3] at power-on. Bit 3 stores the flag VSF[4]_POR_Status which stores the status of pin VSF[4] at power-on. In other embodiments, the system could include more or less than four vendor specific pins. In some embodiments, not all vendor specific pins will include flags for power-on status. In some embodiments, the system can include flags for the status of these pins at other events. The status stored in the flags of FIG. 6 relate to a condition of the signal applied as an input to the pins. In one embodiment, if the signal applied to the input is a logic low signal (e.g., ground) then the flag will store a 0. If the pin is floating, or at a logic high, then the flag will store a 1. Other conditions and assignments of data can also be used.

As discussed above, the technology described herein uses physical authentication to enable a function. For example, memory controller 22 is configured to perform a function if memory controller 22 receives a predetermined sequence of signals on the set of one or more inputs outside of the host interface (e.g., any one or more of VSF[1:4]). The predetermined sequence of signals can be on VSF[4] only or on a combination of pins of VSF[1:4]. In one embodiment, the physical authentication includes setting an input pin of the memory device to a predetermined condition just prior to power-on (or other predetermined event). At power-on (or other predetermined event), the memory device sets a flag if the input pin is at the predetermined condition. Subsequently, the signal at the input pin is changed so that the input pin is no longer at the predetermined condition. The memory device checks the flag and current status of the input pin in response to receiving a request from the host to perform a function. The memory device performs the function if the flag is set and the current status of the input pin is a condition other than the predetermined condition.

Figure 8:
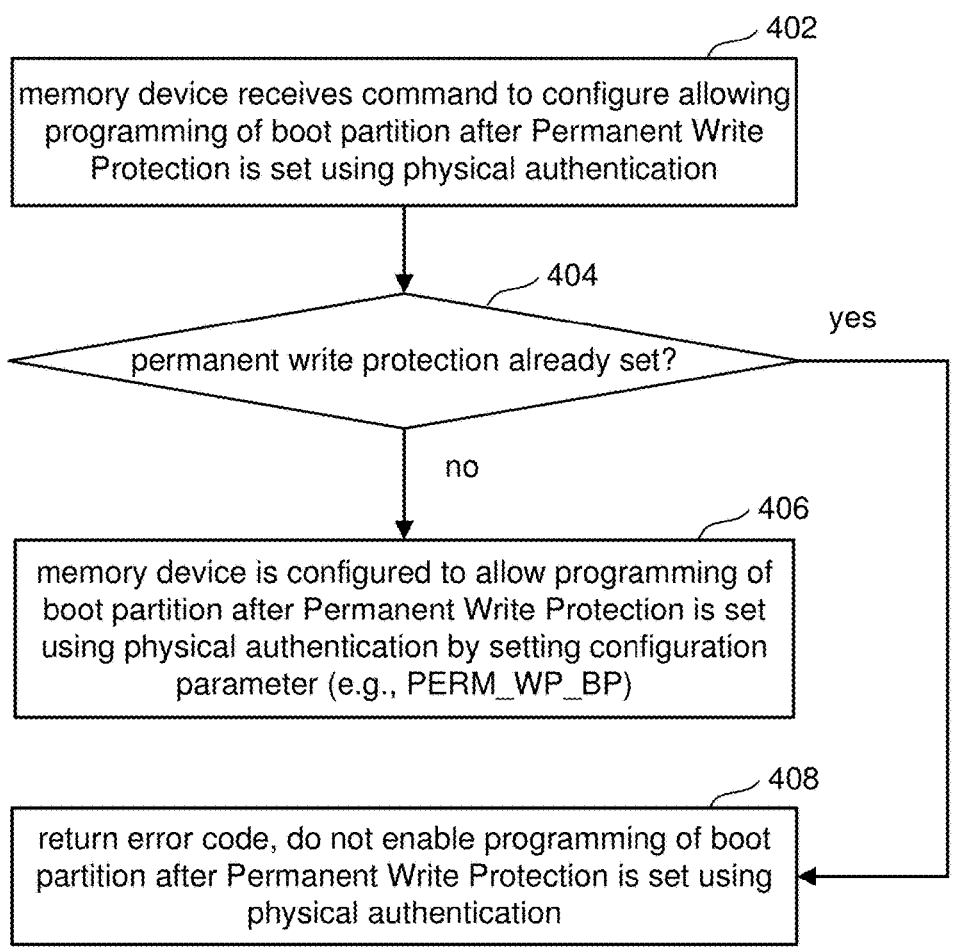
FIG. 8 is a flow chart describing one embodiment of a process for configuring allowance of programming of a boot partition after permanent write protection is set using physical authentication.

FIG. 8 is a flow chart describing one embodiment of a process for configuring memory device 20 to use physical authentication to enable the programming of a boot partition when permanent write protection has been set. The process at FIG. 8 does not actually perform physical authentication or program a boot partition. Rather, it configures memory device 20 to be able to make use of physical authentication later so that if permanent write protection is set, memory device can still update the boot partition.

In step 402 of FIG. 8, memory device 20 receives a command to configure memory device 20 to use physical authentication to enable the programming of a boot partition when permanent write protection has been set (e.g., receiving a request to enable overriding of permanent write protection). One example of step 402 is receiving a write command to write a data "1" to bit 0 PERM_WP_BP depicted in FIG. 6. In step 404, memory device 20 determines whether permanent write protection has already been set. For example, memory device 20 determines whether bit 1 B_PERM_WP_EN depicted in FIG. 5 has been sent to "1". If yes, then memory device 20 is not allowed to configure itself to use physical authentication to enable the programming of a boot partition when permanent write protection has been set. Thus, in step 408, memory device 20 will return an error code to host 2. To configure the use of the feature for writing to a boot partition when permanent write protection has been set, the configuring has to be done prior to setting permanent write protection. An acceptable sequence is (1) configuring of the feature for overriding of the permanent write protection of the boot partition, (2) setting permanent write protection of the boot partition and (3) programming the boot partition with physical authentication. An unacceptable sequence is (1) setting permanent write protection of the boot partition, (2) configuring of the feature for overriding of the permanent write protection of the boot partition, and (3) programming the boot partition. This acts as a safeguard to avoid the case in which this feature is enabled in the field by a hacker. If, step 404, is determined that permanent write protection has not been set, then in step 406 memory device 20 configures the use of physical authentication to enable the programming of a boot partition when permanent write protection has been set. For example, bit 0 of FIG. 6, PERM_WP_BP, is set (enable overriding of permanent write protection because permanent write protection is not already set).

Figure 9:
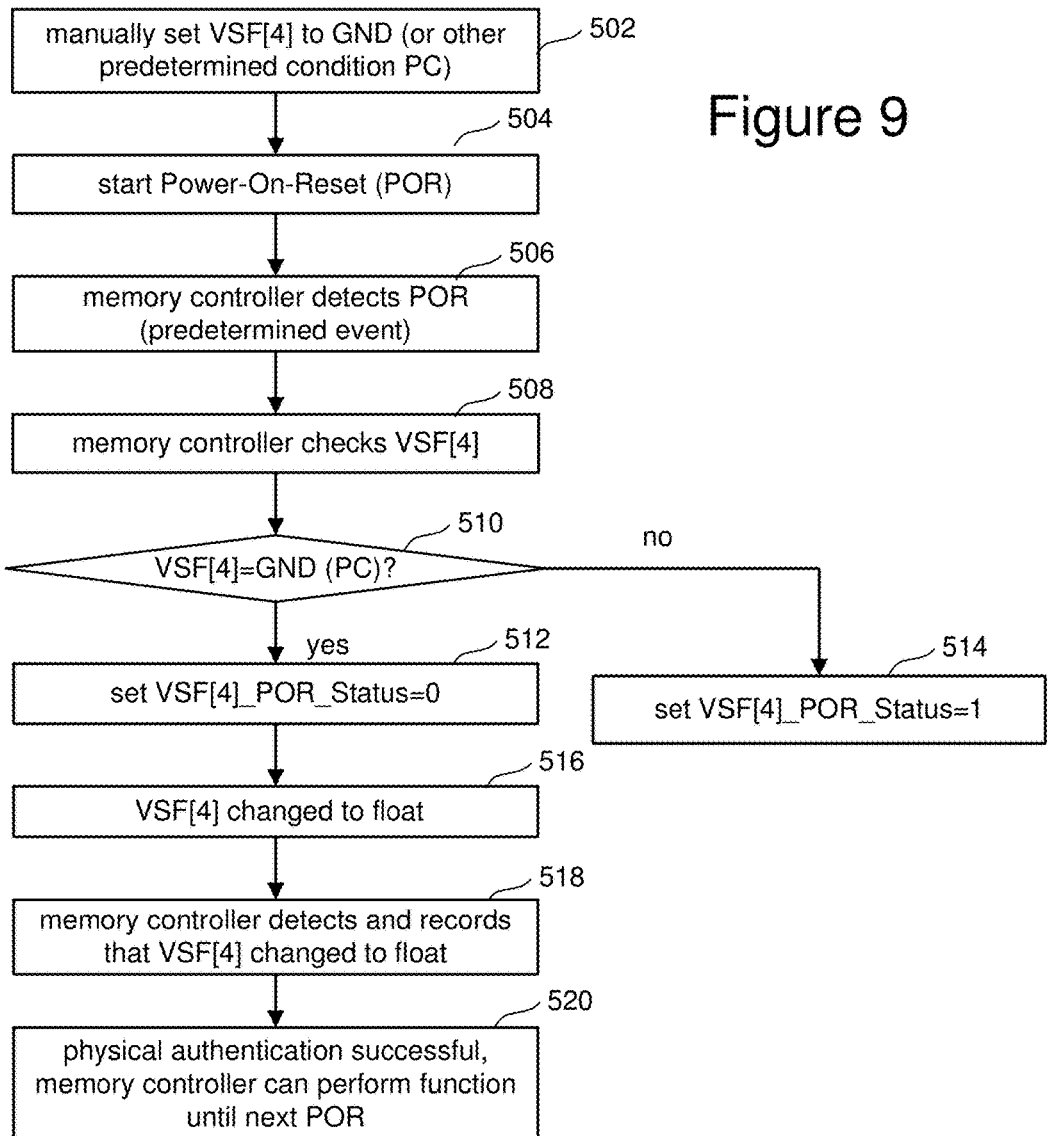
FIG. 9 is a flow chart describing one embodiment of a process for performing physical authentication.

FIGS. 9-12 describe one set of embodiments for using physical authentication to enable a function (e.g., using physical authentication to enable programming of data into the boot partition when the boot partition is permanently write protected). FIG. 9 is a flow chart describing one embodiment of a process for performing physical authentication. In one embodiment related to permanent write protection, the process of FIG. 9 is only performed after memory device 20 configures the use of physical authentication to enable the programming of a boot partition when permanent write protection has been set (e.g., step 406). However, the process of FIG. 9 also covers embodiments that use physical authentication to enable other functions.

In step 502 of FIG. 9, input/output pin VSF[4] is manually connected to ground or another predetermined condition (PC). In one embodiment, a human can manually connect VSF[4] to ground. Alternatively, a test machine or other machine (other than host 2) can manually or automatically connect VSF[4] to ground. Host 2 (and software running on host 2) has no access to VSF[4]. In step 504, host 2 (or another entity) starts a power-on-reset (POR) process. That is, power is turned on or otherwise cycled, or a reset is performed, which has the effect of resetting memory device 20. In step 506, memory controller 22 detects the power-on-reset (predetermined event). In step 508, memory controller 22 checks the condition of pin VSF[4]. If the pin VSF[4] (operating as an input pin) is at ground (the input pin is at a predetermined condition at power-on), then memory controller 22 sets the flag VSF[4]_POR_Status=0 in step 512. If the input pin VSF[4] is not at ground then in step 514 the flag is set VSF[4]_POR_Status=1. In step 516, VSF[4] is changed to floating or logic high (or another status other than the predetermined condition). In step 518, memory controller 20 detects that VSF[4] changed was changed to a condition other than the predetermined condition (e.g., changed to floating or logic high). In one embodiment, memory controller records in a register or memory location (RAM or non-volatile) that VSF[4] changed was changed to a condition other than the predetermined condition. In one embodiment, memory controller 20 periodically samples VSF[4] to sense when there is a change in VSF[4]. In another embodiment, memory controller 20 samples VSF[4] in response to perform a function that requires physical authentication. As a result of the flag being set to 0 (ie VSF[4]_POR_Status=0) and the pin VSF[4] now (or at some point) floating after being at ground during power-on, physical authentication has been successfully performed; therefore, memory controller can perform the function that required physical authentication (step 520). In one embodiment, the ability to perform that function is in effect until the next power-on-reset event.

Figure 10:
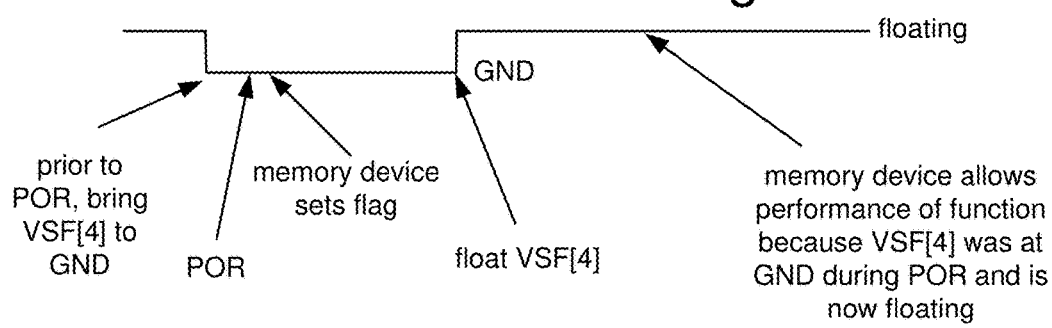
FIG. 10 is a timing diagram depicting an input signal to the memory device during physical authentication.

FIG. 10 is a timing diagram depicting the behavior of the signal applied to pin (acting as an input pin) VSF[4] during the above-described physical authentication. The signal starts out floating and then is lowered to ground prior to power-on-reset (POR). At POR, VSF[4] is sampled my memory controller 22 and memory controller 22 sets the flag. Subsequent to POR, the signal at VSF[4] is allowed to float again or is otherwise raised to a positive voltage above ground, after which memory controller 22 is allowed to perform the protected function (e.g., memory controller 20 allows programming of the boot partition because VSF[4] was at GND during POR and is now floating).

As described above, memory controller 22 is configured to perform a function if memory controller 22 receives a predetermined sequence of signals on a set of one or more inputs outside of the host interface 30. FIG. 9 and FIG. 10 provide examples of the predetermined sequence of signals on the set of one or more inputs outside of the host interface 30.

Figure 11:
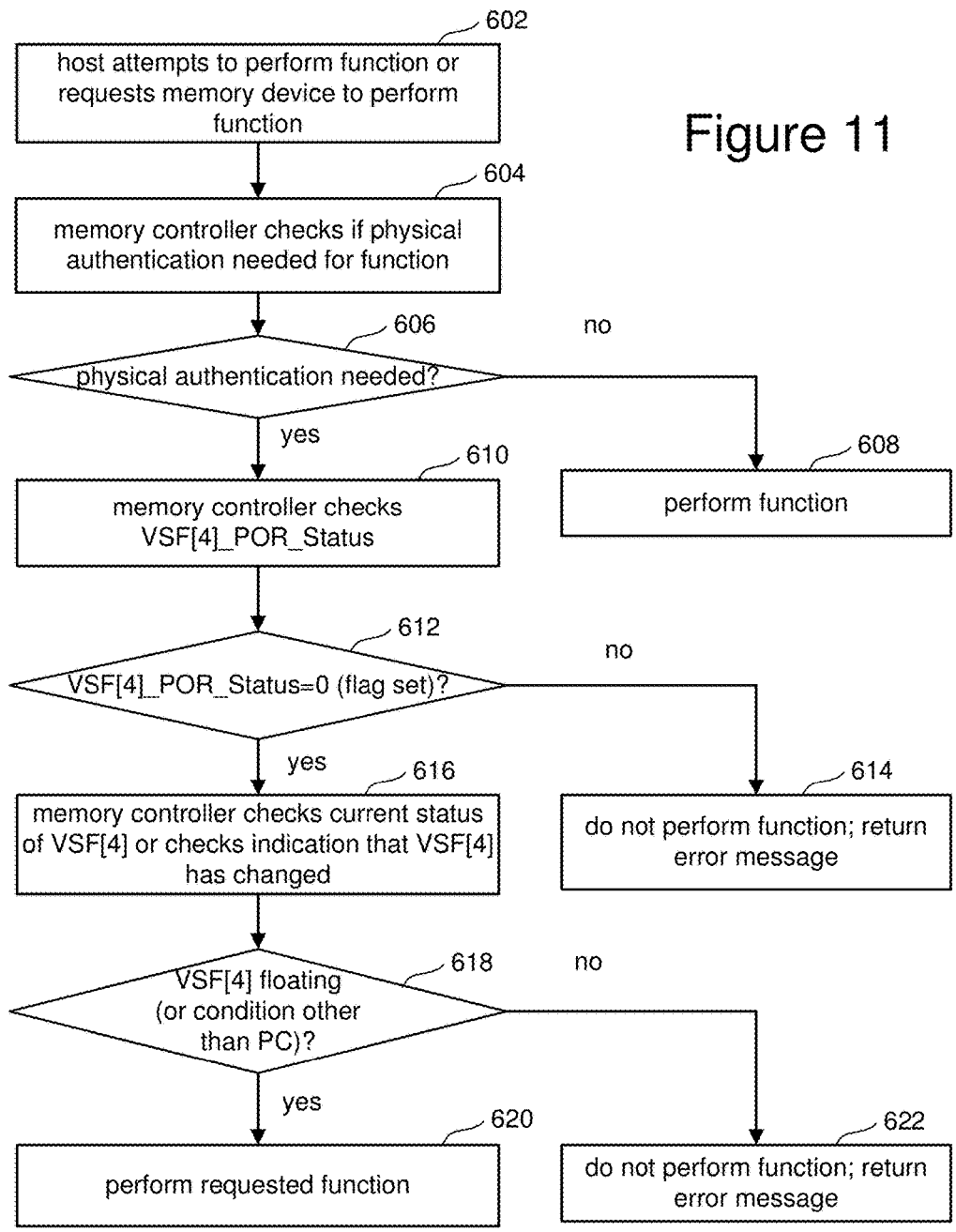
FIG. 11 is a flow chart describing one embodiment of a process for performing a function that requires physical authentication.

FIG. 11 is a flow chart describing one embodiment of a process for performing a function that requires physical authentication. For example, the process of FIG. 11 can be used (in conjunction with the physical authentication of FIG. 10) to program data into one of the boot partitions (e.g., Boot Partition A or Boot Partition B) when the boot partitions are permanently write protected. The process of FIG. 11 applies to other functions as well. In step 602 of FIG. 11, host 2 attempts to perform a function or requests memory device 20 to perform the function. For example, host 2 sends a command to memory device 20 to program either Boot Partition A or Boot Partition B. In step 604, memory controller 22 checks to determine whether physical authentication is needed. For example, if memory device 20 is requested to program either Boot Partition A or Boot Partition B, step 604 can include checking whether permanent write protection is set (e.g., see bit 1 of FIG. 5, B_PERM_WP_EN). If, in step 606, memory controller 22 determines that physical authentication is not needed, then in step 608 memory controller 22 performs the requested function without requiring physical authentication. For example, memory controller 22 will program the addressed boot partition in step 608. If, memory controller 22 determines that physical authentication is required, then in step 610 memory controller 22 checks the flag VSF[4]_POR_Status. If, in step 612, memory controller 22 determines that the flag VSF[4]_POR_Status=0 (the flag is set), then memory controller 22 checks the current status of the pin VSF[4] or (in some embodiments) checks whether there is an indication (see step 518 of FIG. 9) that VSF[4] was detected to have changed from the predetermined condition (e.g., ground) to a condition other than the predetermined condition (e.g., floating).

If the pin VSF[4] is floating (which is a condition other than the predetermined condition) or was previously detected to have been floating (or other condition different than the predetermined condition), then in step 620, memory controller 22 performs the requested function. For example, memory controller 22 performs the requested programming of the addressed boot partition. If the current status of the pin VSF[4] is not floating (is not a condition other than the predetermined condition) or VSF[4] was not detected to have changed from ground to floating, then in step 622 memory controller 22 will not perform the function. For example, memory controller 22 will not perform programming of the boot partition. Instead, in step 622, memory controller 22 returns an error message to host 2.

In step 612, if the flag is not set (e.g., VSF[4]_POR_Status is not equal to 0) then memory controller 22 will not perform the function. Rather, in step 614, memory controller 22 will return an error message.

FIG. 12 is a flow chart describing one embodiment of a process for using physical authentication to enable programming of data into the boot partition when the boot partition is permanently write protected. The process of FIG. 12 is one example implementation of the processes of FIGS. 9 and 11. In step 702, memory controller 22 communicates with host controller 6 to enable host 2 to read data from and write data to non-volatile memory 24. This is the normal and intended operation of host 2. At some point in time (including while performing step 702), overriding of permanent write protection will be enabled prior to setting a boot region (e.g., boot partition) to be permanently write protected (step 704). For example, the process of FIG. 8 will be performed. In step 706, host 2 sets a boot region to be permanently write protected. In step 708, at a predetermined event, memory controller 22 checks the status of input pin VSF[4] of the memory device. VSF[4] is not controllable by the host controller 6. In step 710, memory controller 22 sets the flag if the input pin is at a predetermined condition at the predetermined event. In step 712, memory controller receives a request to program the boot region (e.g., boot partition) after setting the boot region to be permanently write protected. In step 714, memory controlled 22 of the memory device 20 checks the flag and current status of the input pin VSF[4] in response to receiving the request from host 2 to program the boot region. In step 716, the non-volatile memory device 20 programs the boot region after setting the boot region to be permanently write protected if the flag is set and the current status of the input pin is a condition other than the predetermined condition.

The technology described herein uses physical authentication to enable the secure programming of a boot partition, when the boot partition is permanently write protected. This physical authentication can also be used to enable other features/functions.

One embodiment includes a non-volatile memory apparatus, comprising a non-volatile memory and a controller connected to the non-volatile memory. The controller includes a host interface configured to communicate with a host, a memory interface configured to communicate with the non-volatile memory, and a set of one or more inputs outside of the host interface. The controller is configured to perform a function if the controller receives a predetermined sequence of signals on the set of one or more inputs In one example implementation of the controller performing the function if the controller receives a predetermined sequence of signals, the controller is configured to set a flag if an input signal at a first input of the set of one or more inputs is at a predetermined condition at power-on, the controller is configured to check status of the first input subsequent to power-on to determine if the first input has been changed to a condition other than the predetermined condition, the controller is configured to perform the function if the flag is set and the controller determined that the first input was changed to the condition other than the predetermined condition.

One embodiment includes a non-volatile memory apparatus, comprising non-volatile memory and a controller connected to the non-volatile memory. The controller includes a host interface and a memory interface configured to communicate with the non-volatile memory. The controller is configured to set a flag if an input signal at an input pin is at a predetermined condition at power-on. The controller is configured to check status of the input pin subsequent to power-on to determine if the input pin has been changed to a condition other than the predetermined condition. The controller is configured to perform a function if the flag is set and the controller determined that the input pin was changed to the condition other than the predetermined condition.

One embodiment includes a method of operating non-volatile storage, comprising: a non-volatile memory device communicating with a host controller to read and write data responsive to the host controller, the memory device includes a boot region in non-volatile memory; setting the boot region to be write protected; checking status at a predetermined event of an input pin of the memory device that is not controllable by the host controller; setting a flag if the input pin is at a predetermined condition at the predetermined event; receiving a request to program the boot region after setting the boot region to be write protected; the memory device checking the flag and current status of the input pin in response to receiving the request to program the boot region; and the non-volatile memory device programs the boot region after setting the boot region to be write protected if the flag is set and the current status of the input pin is a condition other than the predetermined condition.

One embodiment includes an apparatus, comprising a host and a memory device embedded in and connected to the host. The memory device includes a boot partition. The memory device is configurable to permanently write protect the boot partition. The memory device includes means for using physical authentication to enable programming of data into the boot partition when the boot partition is permanently write protected.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory apparatus, comprising:
   non-volatile memory;
   a plurality of external connections for communicating outside of the non-volatile memory apparatus, a first subset of the external connections comprise a host interface that includes a set of signals configured for communication between the non-volatile memory apparatus and a host that is external to the non-volatile memory apparatus, a second subset of the external connections comprise a set of one or more external inputs to the non-volatile memory apparatus, the set of one or more external inputs are outside of the host interface and are not connected to the host or the non-volatile memory; and
   a controller connected to the non-volatile memory, the host interface and the set of one or more external inputs;
   the controller is configured to provide secure access to a protected function on the non-volatile memory in response to authentication via the set of one or more external inputs that are outside of the host interface, access to the function requires authentication in order for the function to be performed;
   to provide the secure access to the function, the controller is configured to:
      receive a request from the host via the host interface to perform the function on the non-volatile memory,
      test conditions of the set of one or more external inputs that are outside of the host interface to determine if a predetermined sequence of signals has been asserted on the set of one or more external inputs that are outside of the host interface, and
      determine that the authentication is successful and perform the function on the non-volatile memory in response to determining that the predetermined sequence of signals has been asserted on the set of one or more inputs that are outside of the host interface.

2. The apparatus of claim 1, wherein the controller is configured to:
   set a flag if an input signal at a first input of the set of one or more external inputs that are outside of the host interface is at a predetermined condition at power-on;
   check status of the first input subsequent to power-on to determine if the first input has been changed to a condition other than the predetermined condition; and
   perform the function at a current time if the flag is set at the current time and the controller determined that the first input was changed to the condition other than the predetermined condition after determining that the first input was at the predetermined condition at power-on.

3. The apparatus of claim 2, wherein the controller is configured to:
- check the flag and current status of the first input in response to receiving the request to perform the function; and
- perform the function if the flag is set and the current status of the first input is a condition other than the predetermined condition.

4. The apparatus of claim 2, wherein:
- the setting of the flag if the input signal at the first input is at the predetermined condition at power-on and the checking the status of the first input subsequent to power-on to provide physical authentication for performing the function;
- the controller is configured to receive a command to configure using physical authentication to enable performance of the function; and
- the controller configures using physical authentication to enable performance of the function.

5. The apparatus of claim 2, wherein:
- the predetermined condition is the input signal being at ground potential; and
- the condition other than the predetermined condition is the first input floating.

6. The apparatus of claim 2, wherein:
- the non-volatile memory includes a boot region; and
- the function is programming the boot region after the boot region has been write protected.

7. The apparatus of claim 1, wherein:
- the non-volatile memory includes a boot region;
- the function is programming the boot region after the boot region has been permanently write protected; and
- the controller is configured to:
  - set a parameter to implement permanent write protection for a boot region in the non-volatile memory,
  - receive a request to enable overriding of the permanent write protection for the boot region, and
  - enable overriding of the permanent write protection for the boot region only if the parameter to implement permanent write protection for the boot region is not already set.

8. The apparatus of claim 1, wherein:
- the non-volatile memory includes a boot region;
- the function is programming the boot region;
- the controller is configured to set a parameter to implement permanent write protection for the boot region; and
- the controller is configured to program the boot region after setting the parameter to implement permanent write protection for the boot region.

9. The apparatus of claim 1, wherein:
- the non-volatile memory and the controller are embedded in the host.

\* \* \* \* \*